April 13, 1926.
E. E. LANDAHL
1,580,615
TROUGHING CONVEYER
Filed June 9, 1925
2 Sheets-Sheet 1
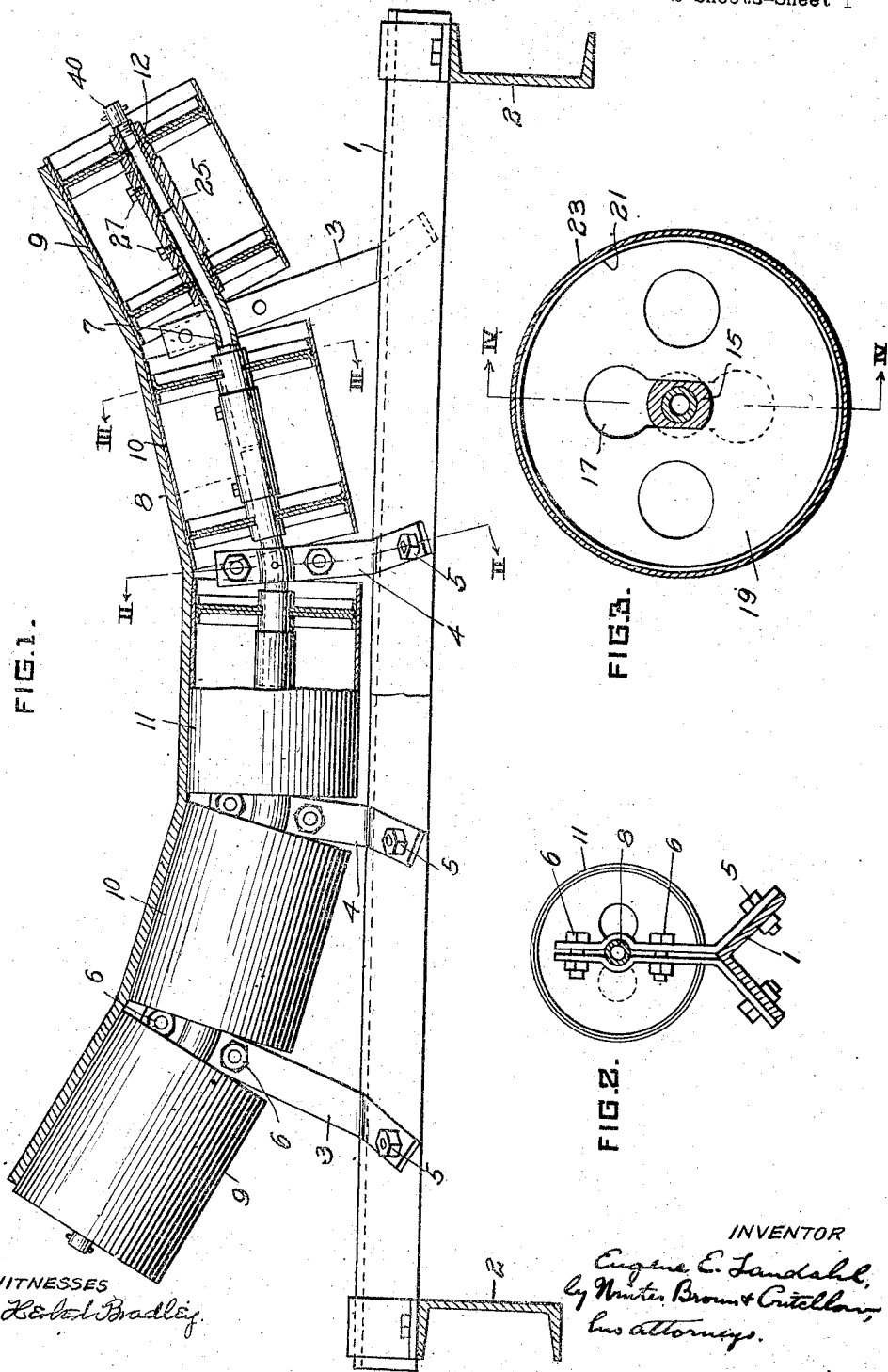
WITNESSES
INVENTOR April 13, 1926.
E. E. LANDAHL
1,580,615
TROUGHING CONVEYER
Filed June 9, 1925   2 Sheets-Sheet 2
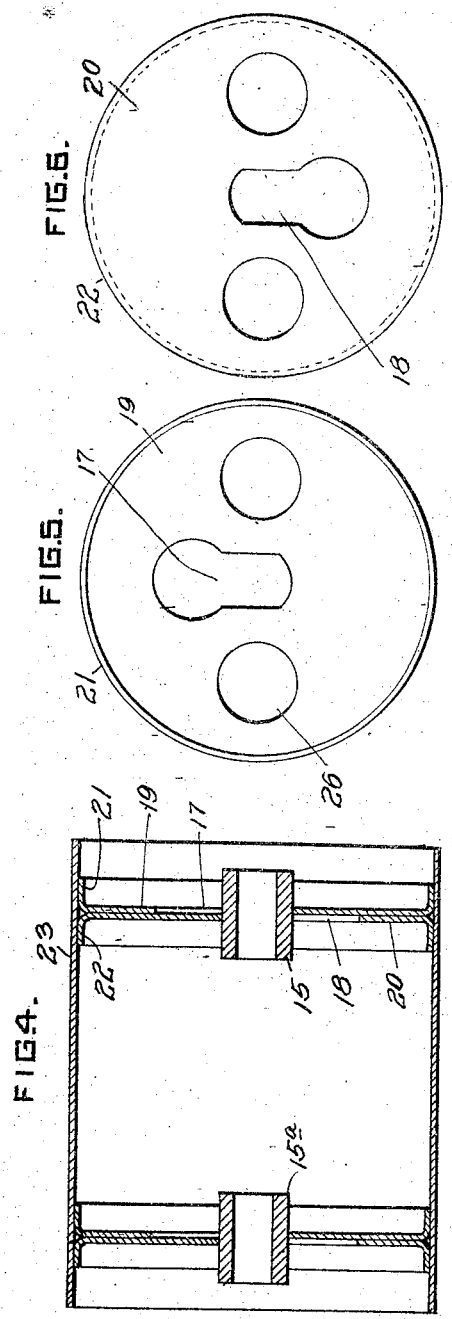
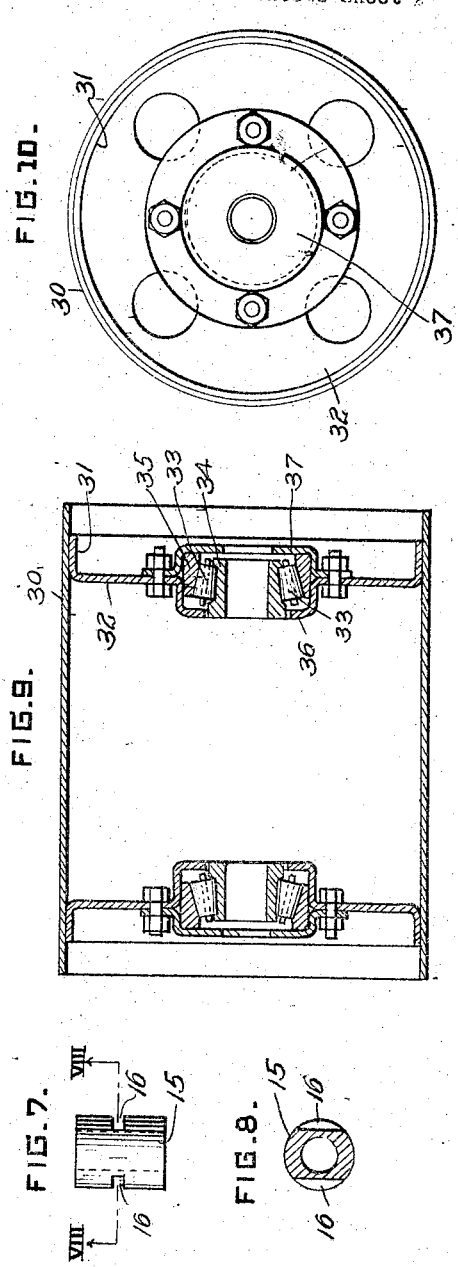
WITNESSES
INVENTOR
Eugene E. Landahl Patented Apr. 13, 1926.

1,580,615

UNITED STATES PATENT OFFICE.

EUGENE E. LANDAHL, OF CRAFTON, PENNSYLVANIA.

TROUGHING CONVEYER.

Application filed June 9, 1925. Serial No. 35,887.

*To all whom it may concern:*

Be it known that I, EUGENE E. LANDAHL, a citizen of the United States, and a resident of Crafton, in the county of Allegheny and State of Pennsylvania, have invented a new and useful Improvement in Troughing Conveyers, of which the following is a specification.

The invention relates to idlers for supporting continuous conveyer belts in the form of troughs, and the object thereof is to simplify the construction of such idlers to the end that they may be quickly and easily assembled and disassembled, and to provide pulleys for such idlers which are light in weight, rigid in construction and economical to manufacture, and to provide a mounting for the pulleys which will eliminate their binding upon supporting brackets.

The invention is illustrated in the accompanying drawings of which Fig. 1 is a combined elevation and central sectional view of one of a series of troughing idlers, the pulleys at the right of the center line being shown in central sectional view; Fig. 2 a transverse sectional view taken on the line II—II, Fig. 1; Fig. 3 a transverse sectional view of a pulley, the plane of view being indicated by the line III—III, Fig. 1, and the view being to enlarged scale; Fig. 4 a longitudinal central sectional view of the pulley, the plane of view being indicated by the line IV—IV, Fig. 3; Figs. 5 and 6 elevations of flanged plates used in the construction of the pulleys shown in Figs. 3 and 4; Fig. 7 a side view of a hub of the pulleys shown in Figs. 3 and 4; Fig. 8 a sectional view of the hub on the plane indicated by the line VIII—VIII, Fig. 7; Fig. 9 a longitudinal central sectional view of a pulley showing a modification of construction; and Fig. 10 an end view of the pulley shown in Fig. 9.

In troughing conveyers of the type here contemplated, a continuous belt conveyer is supported by a series of idlers each comprising a series of pulleys, the end pulleys being inclined upwardly to maintain the conveyer belt in the form of a trough to prevent spillage over its edges. In Fig. 1 there is shown one of a series of these idlers. It comprises a horizontal frame 1, which preferably consists of an angle having its back turned upwardly, and which may be supported at its ends on suitable beams such as channels 2. Extending upwardly from frame 1 there are a plurality of posts 3 and 4 which form clamping brackets at their upper ends for the attachment of tubular trunnions on which the pulleys are mounted. Preferably each post comprises a pair of plates shaped at their lower ends to rest upon frame 1, and adapted to be attached to the frame by bolts 5, and to each other above the frame by bolts 6. The upper ends of the plates are shaped, as shown in Fig. 2, to receive the pulley trunnions.

Each post supports a tubular trunnion intermediate of its ends. As shown in Fig. 1, post 3 supports a trunnion 7 which extends at the right of the post to the end of the pulley wheel mounted on it, and at the left of the post to the middle of the pulley. Post 4 supports a trunnion 8, which extends from the left end of trunnion 7 to the middle of the pulley at the left of post 4. A pulley 9 is rotatably mounted on the right end of trunnion 7, a pulley 10 on the left end of this trunnion and the right end of trunnion 8, and a pulley 11 on the adjacent ends of trunnions 8, it being understood that pulley 11 is at the center of the idler, and that the idler is symmetrical about its center line. It will also be understood that the number of pulleys may vary according to the requirements of service, and that when more or less pulleys are used the number of posts will also vary. As is usual in troughing conveyers of this type, a suitable lubricant is fed from a cup 40 through the trunnions which are provided with openings 12 through which the lubricant passes to lubricate the bearings of the pulleys.

While various forms of pulleys may be mounted upon the trunnions, it is preferred to use pulleys constructed as illustrated in Figs. 3–8. As there shown, the pulley comprises a pair of hubs 15 and 15ª, which are identical with each other. As shown particularly in Figs. 7 and 8, hub 15 is provided externally with a pair of parallel grooves 16 adapted to receive the edges of narrow portions of key-hole slots 17 and 18 (Figs. 5 and 6) formed in plates 19 and 20 which are provided at their outer edges with annular flanges 21 and 22, respectively. These flanges have attached to them a cylinder 23 which forms the belt-supporting face of the pulley.

In assembling a pulley so constructed, the enlarged ends of slots 17 and 18 of plates 19 and 20 are brought into registration with each other in such position that the small portions of the slots extend in opposite directions. Hub 15 is then inserted through the enlarged portions of the slots, and the plates moved radially until their flanges are in registration with each other. In so moving the plates, the edges of the narrow portions of the key-hole slots engage groove 16 in the hub so that the hub cannot rotate within the slots. In the same way like plates are attached to hub 15ª, and thereafter cylinder 23 is attached to the peripheral flanges of the plates in any suitable manner, but preferably by spot or other welding.

When a pulley so constructed is attached to the right hand end of trunnion 7 as viewed in Fig. 1, the pulley is slipped upon the outer end of the trunnion, and simultaneously therewith a thrust sleeve 25 is held in alignment with the interiors of hubs 15 and 15ª so that the trunnion will extend through the sleeve. For thus holding the sleeve in position, plates 19 and 20 are provided with registering hand openings 26. After the trunnion has been fully inserted, suitable set screws 27 or other connecting members are screwed down to properly position the sleeve upon the trunnion so that it will afford a thrust bearing for the pulley. In a similar manner the pulleys 9 and 10 are attached to the left end of trunnion 7 and to trunnion 8.

In Figs. 9 and 10 there is illustrated a roller bearing type of pulley which may be used in place of that just described. The pulley shown in these figures comprises a cylinder 30 attached to flanges 31 of plates 32 which are provided at their central portions with roller bearings. These bearings preferably comprise conical rollers 33 arranged between an inner raceway 34 and an outer raceway 35 which are arranged between an offset portion 36 at the inner edge of plate 32 and a plate 37 attached to plate 32. Plate 37 is preferably resilient so that raceway or ring 35 may be normally urged towards the wide ends of conical rollers 33. This roller bearing pulley may be attached to the trunnions in the same manner as the pulley shown in Figs. 3-8, it being understood that a roller bearing is provided at each end of the pulley as shown.

When it is desired to remove pulley 10 from the idler for the purpose of repairing or replacing it, it is only necessary to detach one from the other of the plates forming post 3, and to loosen the set screws 27 of its thrust-resisting sleeve 25. When this is done, trunnion 7 may be removed from the left end of pulley 10, and such pulley may then be removed from the right end of trunnion 8. Pulley 11 may thereafter be removed by detaching one from the other of the plates forming post 4. For removing pulley 9, it is only necessary to detach the grease cup 40 from the outer end of trunnion 7 and loosen set screws 27. It will thus be seen that the troughing idler provided according to this invention is of simple construction, that its parts may be quickly and easily assembled and disassembled, that the pulleys are light in weight, rigid in construction and economical to manufacture, and that they do not bind at their ends against supporting brackets.

According to the provisions of the patent statutes, I have explained the principle and operation of my invention, and have illustrated and described what I now consider to represent its best embodiment. However, I desire to have it understood that, within the scope of the appended claims, the invention may be practiced by other forms of construction than that particularly illustrated and described.

I claim as my invention:

1. A troughing idler for a conveyer belt, comprising a horizontal frame, a plurality of posts supported by said frame and forming clamping brackets at their upper ends, tubular trunnions engaged intermediate of their ends by said brackets, a thrust resisting sleeve attached to each of said trunnions, and idle belt-supporting pulleys rotatably mounted on said trunnions, each pulley having two hubs arranged one at each end of one of said sleeves.

2. A troughing idler for a conveyer belt, comprising a horizontal frame, a plurality of posts supported by said frame and each comprising a pair of separable plates forming a clamping bracket at their upper ends, tubular trunnions engaged intermediate of their ends by said brackets, a thrust resisting sleeve attached to each of said trunnions, and idle belt-supporting pulleys rotatably mounted on said trunnions, each pulley having two hubs arranged one at each end of one of said sleeves.

3. A pulley for a conveyer-belt troughing idler comprising a pair of hubs each having a pair of oppositely disposed external parallel grooves, a pair of peripherally flanged plates provided with oppositely disposed key-hole slots engaged by said grooves in each hub, and a cylinder attached to the flanges of said plates and locking the plates upon the hubs.

In testimony whereof, I sign my name.

EUGENE E. LANDAHL.